(12) United States Patent
Rohlfing et al.

(10) Patent No.: US 7,922,941 B2
(45) Date of Patent: Apr. 12, 2011

(54) PHOTOCHROMIC PLASTIC OBJECT

(75) Inventors: Yven Rohlfing, Munich (DE); Udo Weigand, Munich (DE); Manfred Melzig, Wessling (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 12/138,117

(22) Filed: Jun. 12, 2008

(65) Prior Publication Data
US 2008/0251772 A1   Oct. 16, 2008

Related U.S. Application Data

(63) Continuation of application No. PCT/EP2006/011858, filed on Dec. 8, 2006.

(30) Foreign Application Priority Data

Dec. 12, 2005   (DE) .......................... 10 2005 059 716

(51) Int. Cl.
*G02B 5/23*   (2006.01)
*G02C 7/10*   (2006.01)

(52) U.S. Cl. .................. 252/586; 351/163; 264/1.32

(58) Field of Classification Search ............... 252/586; 351/163; 264/1.32; 524/110; 428/423.1
See application file for complete search history.

(56) References Cited

U.S. PATENT DOCUMENTS

| | | | |
|---|---|---|---|
| 6,225,466 B1 | 5/2001 | Mann et al. | |
| 6,373,615 B1 | 4/2002 | Mann et al. | |
| 2002/0065366 A1* | 5/2002 | Wirnsberger et al. | 525/88 |
| 2004/0219348 A1* | 11/2004 | Jacquiod et al. | 428/304.4 |
| 2005/0009964 A1* | 1/2005 | Sugimura et al. | 524/110 |
| 2005/0142350 A1* | 6/2005 | Douce et al. | 428/323 |
| 2007/0246692 A1 | 10/2007 | Melzig et al. | |
| 2008/0088044 A1* | 4/2008 | Cano et al. | 264/1.32 |

FOREIGN PATENT DOCUMENTS

| | | |
|---|---|---|
| EP | 0 987 260 A1 | 3/2000 |
| EP | 1 099 743 A1 | 5/2001 |
| JP | 2000-226572 A * | 8/2000 |
| WO | WO 00/29877 A1 | 5/2000 |
| WO | WO 20041057418 A1 * | 7/2004 |
| WO | WO 2006/045495 A1 | 5/2006 |

OTHER PUBLICATIONS

Dieter Wohrlef, Cursten Schomburg, Yven Rohlfing, Michael Wark, and Cunter Schulz-Ekloff, "In Situ Synthesis of Azo Dyes and Spiropyran Dyes in Faujasites and their Photochromic Properties", Host-Guest-Systems Based on Nanopovous Crystals (2003) pp. 29-43, XP009084113.*
Carsten Schomburg,a Michael Wark, Yven Rohlfing,a Gunter Schulz-Ekloffb and Dieter Wohrle, "Photochromism of spiropyran in molecular sieve voids: effects of host-guest interaction on isomer status, switching stability and reversibility", J. Mater. Chem., 2001, 11, 2014-2021 (The Royal Society of Chemistry).*
Alan Sellinger, Pilar M.Weiss, Anh Nguyen, Yunfeng Lu, Roger A. Assink, Weiliang Gong & C. Jeffrey Brinker, "Continuous Self-Assembly of Organic-Inorganic Nanocomposite Coatings that Mimic Nacre", Nature, vol. 394, Jul. 1998, pp. 256-260, Nature © Macmillan Publishers Ltd 1998.*
Wohrle, Dieter et al., "In situ synthesis of azo dyes and spiropyran dyes in faujasites and their photochromic properties", "Host-Guest-Systems Based on Nanporous Crystals", 2003, pp. 29-43, XP009084113 Weinheim, Germany.
International Search Report dated Jun. 4, 2007 (one (1) page).
English translation of the International Preliminary Report (eight (8) pages).
L.B. McCusker et al., "Nomenclature of Structural and Compositional Characteristics of Ordered Microporous and Mesoporous Materials with Inorganic Hosts", Pure Appl. Chem., 73, No. 2, 381-394 (2001).

* cited by examiner

*Primary Examiner* — Harold Y Pyon
*Assistant Examiner* — Bijan Ahvazi
(74) *Attorney, Agent, or Firm* — Crowell & Moring LLP

(57) ABSTRACT

A photochromic plastic object which is composed of a transparent polymeric synthetic resin material, into or onto which at least one substantially mesoporous inorganic host structure is introduced or applied containing one or more embedded organic photochromic dye molecules so as to form a photochromic nanocomposite material. In contrast to prior techniques of adding or applying the photochromic organic dyes to the monomer mixture or prepolymer of a transparent synthetic resin material in a molecular form, in the photochromic plastic article of the present invention color is generated by using the photochromic nanocomposite particles or photochromic nanocomposite structures.

12 Claims, 2 Drawing Sheets

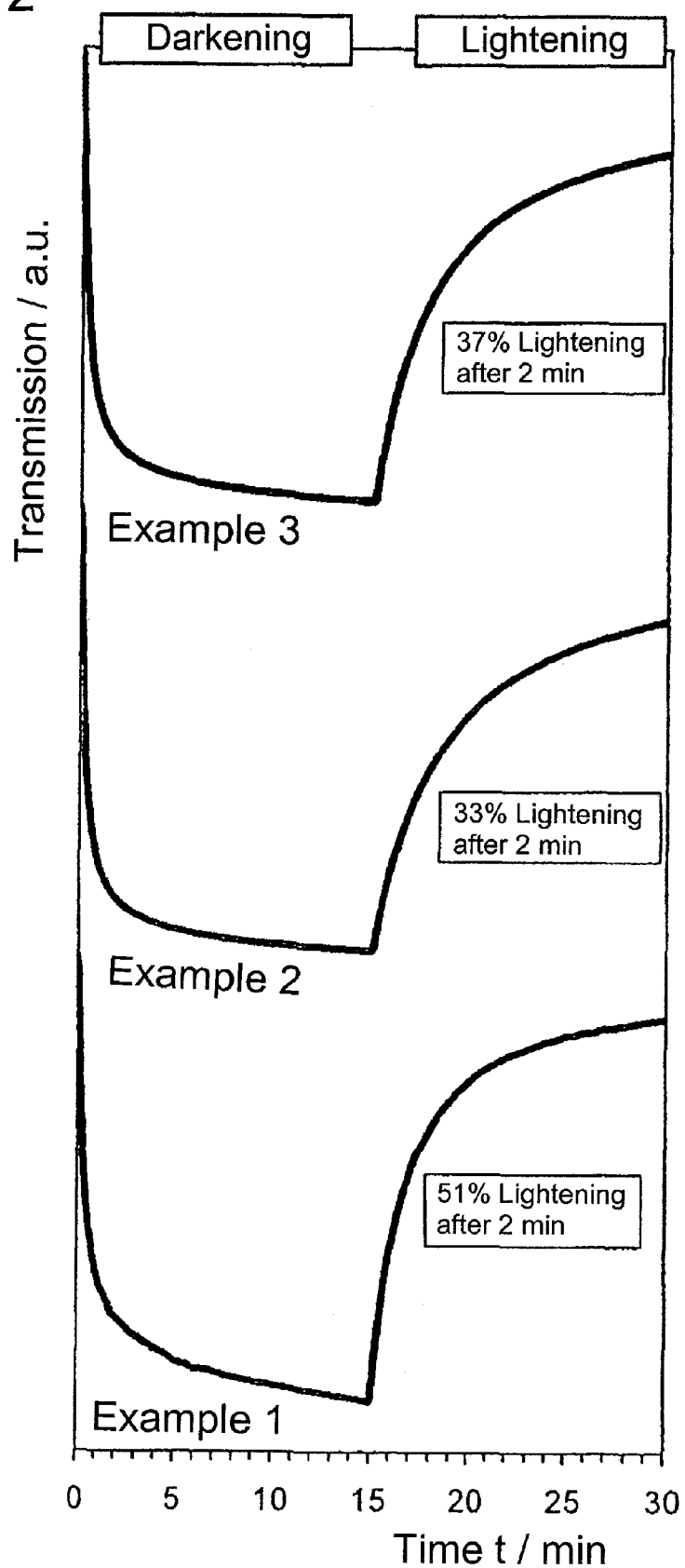

PHOTOCHROMIC PLASTIC OBJECT

CROSS REFERENCE TO RELATED APPLICATIONS

This application is a continuation of international patent application no. PCT/EP2006/011858, filed Dec. 6, 2006, designating the United States of America, and published in German on Jun. 21, 2007 as WO 2007/068410, the entire disclosure of which is incorporated herein by reference. Priority is claimed based on Federal Republic of Germany patent application no. DE 10 2005 059 716.5, filed Dec. 12, 2005.

BACKGROUND OF THE INVENTION

The present invention relates to a photochromic plastic object, constructed from a transparent polymer plastic material, at least one essentially mesoporous inorganic host structure, which has one or more organic photochromic dye molecules (i.e., coloring agents) intercalated, being introduced therein or attached thereto to form a photochromic nanocomposite material. In contrast to the approaches available in the prior art, according to the present invention, photochromic organic dyes are not added in molecular form to the monomer mixture/pre-polymers of the plastic glass, but rather photochromic nanocomposite particles and/or photochromic nanocomposite structures are used to generate the coloration.

Photochromic plastic objects in general and phototropic spectacle lenses made of plastic especially may be produced using photochromic organic dyes. The dyes for phototropic spectacle lenses must fulfill various requirements: (i) high extinction coefficients, (ii) light resistance/high service life, (iii) controllable color curve upon darkening and lightening, (iv) good kinetic properties in darkening and lightening at different temperatures, and (v) compatibility with the polymer substrate. These requirements are fulfilled in particular by compounds made of the substance class of pyrans, in particular naphthopyrans and larger ring systems derived therefrom. Spirooxazine and spiropyran dyes, which were the state-of-the-art until the second half of the 90s, are also suitable for use in ophthalmic lenses.

The dyeing of transparent plastic for use as spectacle lenses is performed industrially in various ways: (i) by compound dyeing, dye being added to the monomer mixture before the polymerization, (ii) by application of a photochromic thin-film, the substrate being provided with a film having a functional layer producible according to method (i) using spin coating, dip coating, etc., or gluing, or (iii) by surface dyeing, the dyeing being performed by thermodiffusion of the photochromic dyes into the plastic object.

The dye molecules are thus influenced chemically and physically in a new environment—a matrix—and must be adapted thereto. Different plastics and polymer compositions are used in the production of spectacle lenses, as a result of the requirements for the product and its intended use. The cured polymers differ in index of refraction, hardness, impact resistance, weight, etc.

A change of the polymer matrix may have negative effects on the photochromic behavior of the organic dye and thus result in significant efforts in research and development or even prevent the commercial use of the dye class. Therefore, it is noted in U.S. Pat. No. 6,373,615 (=DE 198 52 680) that a comparative study of dyes may only be performed in identical matrices.

The dye and surrounding matrix are parts of the photochromic system and thus cannot be observed independently of one another. The photochromic properties are controlled on one hand by the selection of the dye class and substitution of its basic framework and on the other hand by the surrounding matrix. If it is possible to make the dyes independent of the matrix effects of the plastic material of the ophthalmic lenses, the above restrictions no longer apply. An approach for removing these existing restrictions is described in EP 1 099 743 A1. A "protective envelope" for the isomeric center of the ring-opening dye is described therein, which is adapted in its molecular dimensions.

SUMMARY OF THE INVENTION

It is therefore an object of the present invention to provide photochromic plastic objects whose photochromic properties may be controlled independently of the plastic substrate employed.

A further object of the invention is to provide photochromic plastic objects in a comparatively simple manner using plastics (e.g., polycarbonate) which heretofore could only be used via the complex method (ii).

These and other objects are achieved by the invention as described and claimed hereinafter.

In particular, a photochromic plastic object is provided according to the present invention, which is constructed from at least one transparent polymeric plastic (i.e., synthetic resin) material, at least one essentially mesoporous inorganic host structure, which has one or more organic photochromic dye molecules intercalated, being introduced therein or applied thereto to form a photochromic nanocomposite material.

If, according to the invention, corresponding photochromic dyes are analyzed in a material having internal shaping and order and this material is used in the form of small particles or thin films instead of the dye molecules, as described in the prior art, the photochromic properties are only influenced by the influence of the host material of the molecules and no longer by the polymers.

The photochromic nanocomposite material provided according to the invention may be provided in particle form or as a structured layer.

If particles are intercalated in a polymer substrate, the plastic object preferably contains more than 1 wt.-% nanocomposite.

If the photochromic nanocomposite material is provided as a structured layer, layer thicknesses up to multiple micrometers are typical.

Within the scope of the present invention, the pores of the host structure in which one or more organic photochromic dye molecules are intercalated preferably have a diameter of 1.5 to 100 nm. The pore structure is more preferably implemented as essentially mesoporous, the mesopores typically being 1.5 to 5 nm in size.

The technical term host-guest material is generally well-known in this context, the so-called host matrix having a texture in the form of pores, cavities, or chambers, which may also be cross-linked two-dimensionally or three-dimensionally (see D. Wöhrle, G. Schulz-Ekloff, *Adv. Mater.* 1994, 6, 875). Both the dimensions of the intercalated molecular guests, and also those of the surrounding host matrix are nanoscale. These systems are included by those skilled in the art in the nanocomposite materials (*Chem. Mater.* 2001, 13(10)), the inorganic host materials also being referred to as molecular sieves (D. Breck, *Zeolite Molecular Sieves* 1994, Wiley, London).

The inorganic host structure is preferably an ordered, inorganic material based on $SiO_2$, $Al_2O_3$, $[m\{Al_2O_3\}.n\{SiO_2\}]$, $TiO_2$, $ZnO$, $ZrO_2$ or other metal oxides and their mixed oxides or based on aluminophosphates. The metal oxide structure is typically produced by polycondensation in the presence of amphiphilic structure producers. The host structure may be crystalline or have long-range order with amorphous pore walls. The pore systems are freely accessible and may have various geometric orders. The cavity structure of the host materials used must be capable of receiving the guest molecules without force. One differentiates between micropores (<2 nm), mesopores ($\geqq$2 nm, <5 nm), and macropores ($\geqq$5 nm) (IUPAC nomenclature).

Microporous zeolites—crystalline aluminosilicates [m{$Al_2O_3$}. n{$SiO_2$}]—are produced by sol-gel synthesis using organic cations. The size of the zeolite cages is influenced by the template action of the cations. Various photochromic host-guest materials may be produced by in situ synthesis of spiropyran dyes in the so-called super cage (diameter 1.3 nm) of the zeolite Y (Faujasit, FAU). However, these experiments have shown that with almost identical cavity and guest size, the cage effect already described in the 60s results in the stabilization of the colorless and colored isomers. The darkened nanocomposites first lighten under strong irradiation by visible light and are therefore not usable according to the present invention.

Naphthopyran dyes from the groups of the h-annellated benzo[f]chromenes, as are disclosed in published US patent application no. US 2007/0246692 (=WO 2006/045495), for example, or spirofluorenopyrans (cf. U.S. Pat. No. 6,225,466 or U.S. Pat. No. 6,331,625) typically reach a size of 15-20 Å. To avoid a steric restriction of the dyes, the cavity structures of the host must be larger than those of the guest. The nanocomposite materials and/or particles according to the present invention are produced by intercalating the dyes in the essentially mesoporous structures, which are then subsequently introduced into the polymer of the glass or applied thereto.

It has been possible since 1992 to produce mesoporous structured materials having freely accessible pores artificially (J. Beck et al., *J. Am. Chem. Soc.* 1992, 114, 10834). This is achieved by the use of self-organizing structure producers, which may form larger templates. These include anionic and cationic surfactants, oligomeric compounds having hydrophilic and lipophilic sections, and other self-organizing, amphiphilic compounds. In a coordinated process, amorphous wall structures are synthesized around the templates by polycondensation (LCT mechanism, liquid crystal templating mechanism). Countless publications have described this young substance class in the meantime. Known representatives are the MCM materials and the SBA materials, for example. One skilled in the art is capable of controlling the texture parameter and the morphology of the particles.

Thus, in the scope of the present invention, the intercalation of photochromic h-annellated benzo[f]chromenes in 30-35 Å large pores of a mesostructured silicate having hexagonal order (p6 mm) and subsequent introduction of these nanoparticles in polymer glass may be listed as an example here. For example, related material may also be produced as a silicate structure having a body-centered cubic (lm3m) pore system, which contains h-annellated benzo[f]chromenes, on a corresponding polymer substrate.

In addition, the light transparency of the spectacle glass must be ensured. Even particles or cavities having a size >50 nm may result in scattering of the visible light, which causes clouding. If the indices of refraction of nanoparticle and polymer substrate are adapted (index matching), larger particles or layered structures may also be used. The plastic objects according to the invention contain nanoparticles having narrower pore size distribution without macropores. The particles used are produced in the size required for transparency or possibly processed (e.g., using crushers, etc.).

As noted above, the photochromy is strongly influenced by the chemical environment surrounding the dye. Therefore, a chemical modification of the internal surface of the porous nanoparticle is also provided in the scope of the present invention, i.e., in one embodiment of the present invention, the porous host structure has a chemically functionalized surface. The chemical surroundings in the interior of a porous metal oxide are typically determined by hydroxy groups, which are present free, bridged via hydrogen atoms, or having attached water molecules. Targeted functionalization may control the stabilization of the isomers of the photochromic guest. Functional groups for passivation may be alkyl, polyhalogenated alkyl, and branched alkyl residues, for example. Polar functional groups may be, for example, amino, secondary and tertiary amino, ammonium halogenide, mercapto, cyano, and halogen groups. The functionalization may typically be performed via silylation reagents (precursors), selected from (i) an alkoxysilane group for anchoring, a $(CH_2)_n$ spacer having n=2-18, and the functional group, (ii) functionalized halogen silanes, (iii) functionalized disilazanes, (iv) functionalized disiloxanes or other reagents which may be condensed. The precursors ideally form a cross-linked monolayer on the metal oxide surface (SAM, self-assembly monolayer), which is connected via oxygen bridges to the surface. This procedure for functionalization has been prior art since the early 90s.

Using functionalization, with suitable substitution of the organic dyes for diffusion control, covalent or ionic bonding of the guests may occur (Y. Rohlfing et al., *Stud. Surf. Sci. Catal.* 2000, 129, 295). In a further embodiment of the present invention, the photochromic organic dyes are accordingly bound to the chemically functionalized surface of the host structure using covalent or ionic bonding. Bonding via peptide bonds or sulfonamide bonds is preferable here.

To avoid agglomeration and/or improvement of the material properties of the plastic objects according to the invention, cross-linking of the nanocomposite particles may be performed in the plastic substrate. In a further embodiment of the present invention, the nanocomposite particles are therefore cross-linked with the polymer plastic material using silylation reagents which may be polycondensed. For this purpose, the outer surface of the nanoparticles is provided with functional groups which may be polymerized. The functionalization is performed as described above using silylation reagents. The nanoparticles modified in this way may be included as a comonomer in the polymerization of the plastic glass. The handling of corresponding silanes is known to one skilled in the art. A typical system for cross-linking metal oxide particles in polyacrylates is, for example: (a) an acryloxysilane, (b) a glycidoxysilane, and (c) pentaerythritol for the cross-linking.

The organic photochromic dyes contained in the photochromic plastic object are not subject to any specific restriction. The dyes are preferably selected from the compound classes of (i) 3H-naphthopyrans and 2H-naphthopyrans, including the larger ring systems derived therefrom, the (ii) spirooxazine dyes, the (iii) spiropyran tolerance, or (iv) mixtures thereof.

The plastic object according to the invention contains one or more plastic materials as the transparent plastic material which is used in particular as a carrier or matrix for the photochromic nanocomposite particles. The usable plastic materials may be the plastics typically usable in the prior art, in particular for ophthalmic purposes. For example, the plastic material may be selected from poly($C_1$-$C_{12}$-alkyl)methacrylates, polyoxyalkylene methacrylates, polyalkoxyphenol methacrylates, cellulose acetate, cellulose triacetate, cellulose acetate propionate, cellulose acetate butyrate, polyvinyl acetate, polyvinyl alcohol, polyvinyl chloride, polyvinylidene chloride, polycarbonates, polyesters, polyurethanes, polyethylene terephthalate, polystyrene, poly-α-methylstyrene, polyvinyl butyral, copoly(styrene-methylmethacrylate), copoly(styrene acrylonitrile) and polymers made of components of the group comprising polyol(allyl-carbonate) monomers, polyfunctional acrylate, methacrylate, or diethylene glycol dimethacrylate monomers, ethoxylated bisphenol-A-dimethacrylate monomers, diisopropenyl benzene monomers, ethylene glycol bis-methacrylate monomers, poly(ethylene glycol)bismethacrylate monomers, ethoxylated phenolmethacrylate monomers, alkoxylated polyalcohol acrylate monomers, and diallylidene pentaerythrite monomers or mixtures thereof.

The plastic material may in particular be a solid, transparent homopolymer or copolymer selected from the group comprising poly(methylmethacrylate), poly(ethylene glycol bis-methacrylate), poly(ethoxylated bis-phenol-A-dimethacrylate), thermoplastic polycarbonate, polyvinylacetate, polyvinylbutyral, polyurethane or a polymer selected from the components of the group comprising diethylene glycol bis(allylcarbonate) monomers, diethylene glycol dimethacrylate monomers, ethoxylated phenolmethacrylate monomers, ethoxylated diisopropenylbenzene monomers, and ethoxylated trimethylolpropane triacrylate monomers.

The photochromic plastic object according to the invention may also have one or more hard layers which improve the scratch resistance. In addition, one or more typical nonreflective layers may also be provided, preferably on the side of the plastic object facing away from the light.

The present invention also relates to the use of such photochromic plastic objects in optical systems, in particular for ophthalmic purposes, as lenses for spectacles of all types, such as sunglasses, protective glasses, visors for helmets, and the like.

EXAMPLES

The present invention is illustrated in further detail by the following, non-limiting examples:

The production of the photochromic plastic object according to the invention is performed in multiple steps:

Example 1

(i) Production of Mesoporous Nanoparticles Having One-dimensional Pore Order

Five liters of double-distilled water were heated to 60° C. 14 grams sodium metasilicate (ALDRICH, number 30, 781-5) were added while stirring. The solution was stirred at 60° C. until it is clear (approximately 1 hour). 15.8 g cetyltrimethyl ammonium bromide was then added. The solution was stirred further at 60° C. until it is clear. The stirring was continued for 2 hours. 17.8 g sodium chloride was added to the mixture while stirring. After waiting until the salt had dissolved completely, 12 ml of isopropyl acetate were then added. The temperature was maintained after the addition and the solution was intensively stirred for 30 minutes.

After ending the stirring, the temperature was maintained for 3 days. Nanoparticles have formed in the reaction solution, which are completely suspended. Filtration using typical methods is not possible because of the small particle size. The particles are separated by centrifuging multiple times at 15,000 G. The pasty material obtained is slurried multiple times in double-distilled water and the suspension is centrifuged again.

The nanoparticles were heated to 600° C. at 1° C./minute. A pure white, homogeneous powder was obtained.

The mesoporous material produced according to the example has a mesopore volume $V_{mes}$ of 0.695 cm$^3$/g, a total surface area $S_{tot}$ of 1067 m$^2$/g, and an internal surface area $S_{mes}$ of 812 m$^2$/g. The pore diameter $D_{mes}$ is approximately 3.4 nm, the diameter of the individual particles $D_{particle}$ is approximately 35 to 40 nm.

(ii) Modification of Porous Nanoparticles Using Alkoxysilane

The porous nanoparticles from step (i) are dried in vacuum and suspended in dried dichloromethane under inert gas atmosphere. After adding 5 mmol 3-aminopropyl triethoxysilane/g nanoparticles, the suspension is stirred for multiple hours and centrifuged according to step (i). A pure white, homogeneous powder is obtained.

The modified mesoporous material has a mesopore volume $V_{mes}$ of 0.360 cm$^3$/g, an internal surface area $S_{mes}$ of 541 m$^2$/g. The reduced pore diameter $D_{mes}$ is approximately 2.7 nm.

(iii) Sorption of a Naphthopyran Dye in Porous Nanoparticles

The porous nanoparticles from step (ii) are dried in vacuum and suspended in dried dichloromethane under inert gas atmosphere. After adding a photochromic spirofluorenopyran compound of the following structural formula I, as disclosed in U.S. Pat. No. 6,225,466 (=EP 987,260), Formula I

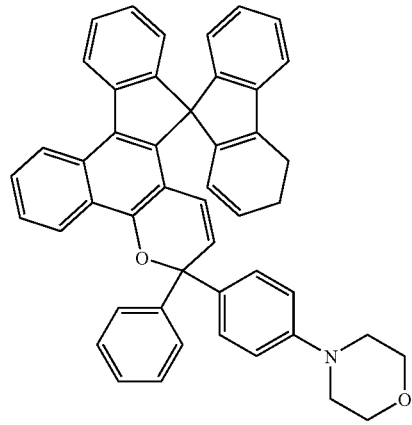

the solution is stirred under inert gas until the dye is completely in solution. The sorption of the dye by the host material is already expressed in the decoloring of the mixture. The photochromic nanocomposite material thus produced is centrifuged according to step (i). A blue-gray, homogeneous powder is obtained.

(iv) Production of a Photochromic Plastic Object from Polyacrylate

The nanocomposite materials according to the invention from step (iii) are suspended in the monomer solution of the acrylic while stirring. After adding a peroxide catalyst, the mixture is polymerized in a casting mold at elevated temperature. The polymerization is terminated at 100° C. after demolding.

Example 2

Performed as in example 1, with the difference that the modification of the structure (step (ii)) was omitted.

Example 3

Performed as in example 1, with the differences that instead of sodium chloride, an equimolar quantity of ammonium chloride was added (step (i)) and the modification of the host structure (step (ii)) was omitted.

The mesoporous material from step (i) has a mesopore volume $V_{mes}$ of 0.478 cm$^3$/g, a total surface area $S_{tot}$ of 808 m$^2$/g, and an internal surface area $S_{mes}$ of 637 m$^2$/g. The pore diameter $D_{mes}$ is approximately 3.0 nm, the diameter of the individual particles $D_{particle}$ is approximately 35 to 40 nm.

Example 4

Performed as in example 2, with the difference that in the last step a photochromic plastic object made of polycarbonate is produced. Step (i) is performed analogously to example 1, (i), and step (ii) is performed analogously to example 1, (iii).

(iii) Polycarbonate granules are dissolved in dichloromethane. The nanocomposite material from step (ii) is added to the solution and suspended homogeneously while stirring. The mixture is cast in a mold and cured into the sample body.

The structural data were ascertained from nitrogen sorption isotherms (device MICROMERITICS ASAP 2010, 80 measurement points). The measured data was analyzed using t-plot methods and BET methods. The particle sizes were determined using transmission electron microscopy (device JEOL JSM-6700F).

BRIEF DESCRIPTION OF THE DRAWINGS

FIG. 2 is a kinetic diagram showing the change in kinetic properties of the spirofluorenopyran photochromic dye in the mesoporous materials of Examples 1, 2 and 3.

DETAILED DESCRIPTION

Figure 1:
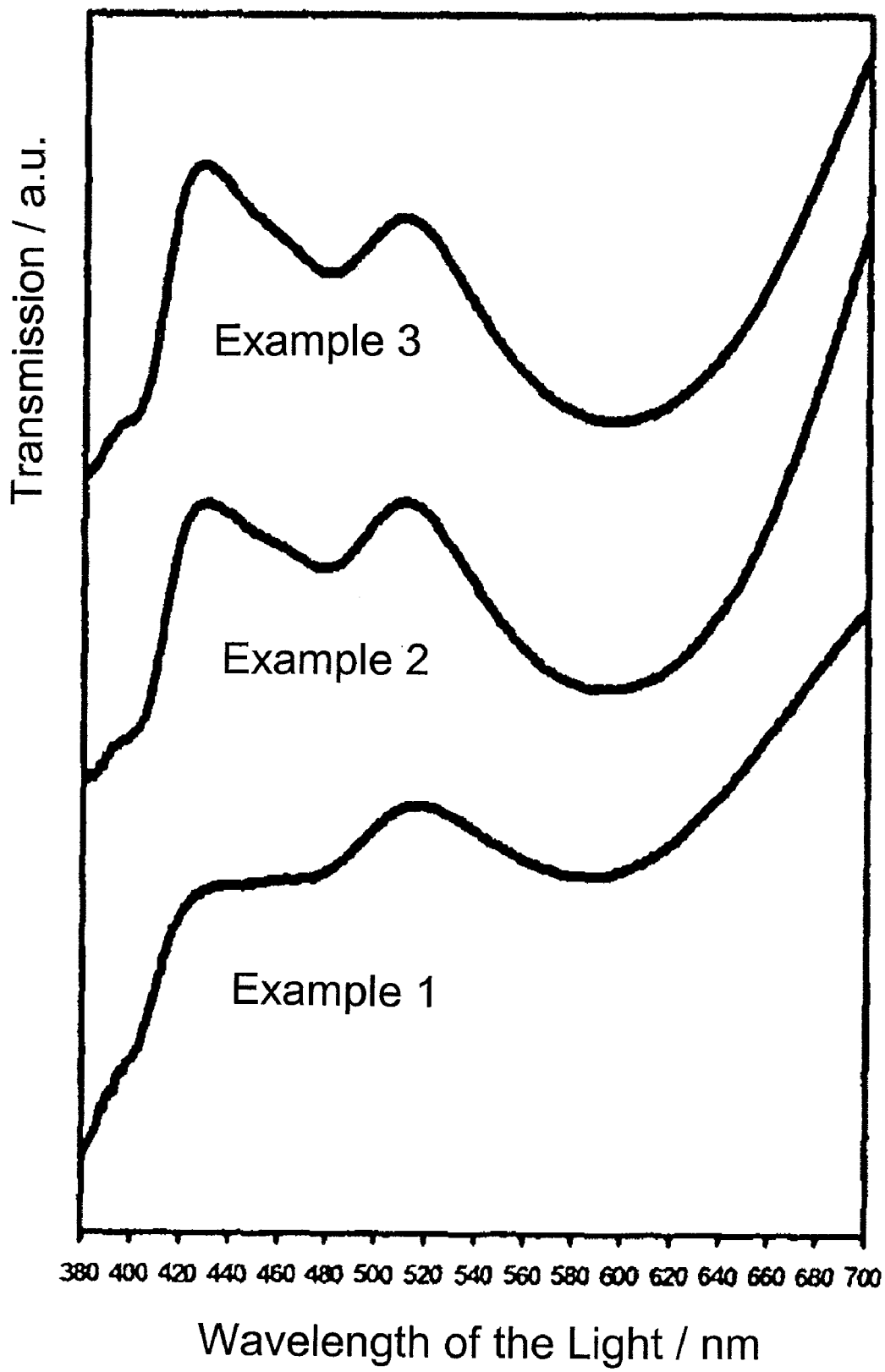
FIG. 1 is a graph showing the change in coloration of a spirofluorenopyran photochromic dye embedded within the mesoporous materials of Examples 1, 2 and 3.

FIG. 1 shows the change of the coloration of a spirofluorenopyran compound under the influence of the change of the mesoporous material used as the matrix (see preceding examples). The nanocomposite particles are introduced into identical plastic substrates in each case.

FIG. 2 shows the change of the kinetic properties of the spirofluorenopyran compound under the influence of the change of the mesoporous material used as a matrix in the form of a kinetic diagram. The values specified in FIG. 2 for the percentage lightening relate to the particular darkening after 15 minutes exposure using a xenon arc lamp at 50 klux.

For better overview, the spectra and kinetic plots are shifted toward one another on the ordinate.

As shown in the examples, the controlled production of porous nanoparticles, possibly in combination with methods for surface modification, results in tailor-made structures for embedding in the particular plastic substrates.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A photochromic plastic object, constructed from a polymer plastic material, wherein
    at least one essentially mesoporous inorganic host structure, which has one or more organic photochromic dyes intercalated therein to form a photochromic nanocomposite material, is introduced in or applied to said polymer plastic material;
    the pores of the host structure in which one or more organic photochromic dye molecules are intercalated have a diameter of 1.5 to 5 nm;
    said object is a spectacle lens selected from the group consisting of eyeglass lenses, sunglass lenses, safety glass lenses and protective goggles, or said object is a helmet visor, and
    the organic photochromic dyes are dyes which darken upon exposure to light and are selected from the group consisting of:
    (i) 3H-naphthopyrans, 2H-naphthopyrans, and larger ring systems derived therefrom;
    (ii) spirooxazine dyes; and
    (iii) mixtures of two or more of the foregoing.

2. The photochromic plastic object according to claim 1, wherein the nanocomposite material is provided in particle form.

3. The photochromic plastic object according to claim 2, wherein the nanocomposite material provided in particle form is cross-linked with the polymer plastic material by silylation reagents.

4. The photochromic plastic object according to claim 3, wherein the silylation reagents are polycondensed.

5. The photochromic plastic object according to claim 1, wherein the nanocomposite material is provided as a structured layer.

6. The photochromic plastic object according to claim 1, wherein the porous host structure is an ordered, inorganic material comprising $SiO_2$, $Al_2O_3$, $[m\{Al_2O_3\}.n\{SiO_2\}]$, $TiO_2$, ZnO, $ZrO_2$, mixed oxides of two or more of the foregoing, or aluminophosphates.

7. The photochromic plastic object according to claim 1, wherein the porous host structure has a chemically functionalized surface.

8. The photochromic plastic object according to claim 7, wherein the functionalized surface is functionalized with functional groups selected from the group consisting of straight-chain and branched-chain alkyl groups, polyhalogenated alkyl groups, primary, secondary, and tertiary amino groups, ammonium halogenide groups, mercapto, cyano, and halogen groups.

9. The photochromic plastic object according to claim 7, wherein the photochromic organic dyes are bound to the chemically functionalized surface of the host structure by covalent or ionic bonding.

10. The photochromic plastic object according to claim 1, wherein the nanocomposite material is cross-linked with the polymer plastic material by silylation reagents.

11. The photochromic plastic object according to claim 10, wherein the silylation reagents are polycondensed.

12. A photochromic plastic object according to claim 1, wherein said object is an ophthalmic lens.

* * * * *